US012110833B1

(12) United States Patent
Koo

(10) Patent No.: US 12,110,833 B1
(45) Date of Patent: Oct. 8, 2024

(54) APPARATUS AND METHOD FOR DIAGNOSING BLOW-BY GAS RECIRCULATION SYSTEM

(71) Applicants: HYUNDAI MOTOR COMPANY, Seoul (KR); KIA CORPORATION, Seoul (KR)

(72) Inventor: Bon Chang Koo, Seongnam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 18/376,972

(22) Filed: Oct. 5, 2023

(30) Foreign Application Priority Data

May 26, 2023 (KR) ........................ 10-2023-0068594

(51) Int. Cl.
*F02D 41/22* (2006.01)
*F01M 13/00* (2006.01)
*F02D 41/18* (2006.01)

(52) U.S. Cl.
CPC ............. *F02D 41/22* (2013.01); *F01M 13/00* (2013.01); *F02D 41/18* (2013.01); *F01M 2013/0083* (2013.01)

(58) Field of Classification Search
CPC ......... F02D 41/22; F02D 41/18; F01M 13/00; F01M 2013/0083
See application file for complete search history.

(56) References Cited

U.S. PATENT DOCUMENTS 2,500,716 A * 3/1950 Sues .................... F01M 11/061 137/391
11,136,949 B1 * 10/2021 Dadam ................... F02B 37/04
2011/0290004 A1 * 12/2011 Korenaga ............ F01M 13/023 73/35.01
2016/0230624 A1 * 8/2016 Rollinger ............... F01M 11/10
2019/0271277 A1 * 9/2019 Kim ...................... B60W 50/14
2020/0378329 A1 * 12/2020 Muto ...................... F02D 41/22
2021/0180485 A1 * 6/2021 Koo ................... F01M 13/0011

FOREIGN PATENT DOCUMENTS

CN 106436629 A * 2/2017
WO WO-2005068919 A1 * 7/2005 ............ F25B 49/005
WO WO-2017016684 A1 * 2/2017 ............. B01D 45/08
WO WO-2017033548 A1 * 3/2017 ......... F01M 13/0405
WO WO-2017110242 A1 * 6/2017 ............. F01M 13/00
WO WO-2017199396 A1 * 11/2017 ............ E02F 9/0883

* cited by examiner

*Primary Examiner* — Joseph J Dallo

(74) *Attorney, Agent, or Firm* — MCDONNELL BOEHNEN HULBERT & BERGHOFF LLP

(57) ABSTRACT

An apparatus for diagnosing a blow-by gas recirculation system may include a head portion of an engine configured to form a combustion chamber, a head cover provided on an upper portion of the head portion, a crankcase formed on a lower portion of the combustion chamber, an intake line through which an intake-air flows to the combustion chamber, a breather hose connecting the crankcase and the intake line at an upstream side of a compressor mounted on the intake line, a PCV hose connecting the crankcase and a surge tank, and a controller configured to determine an abnormality of the breather hose based on a modelled crankcase pressure determined from an atmospheric pressure and an intake flow rate introduced through a throttle valve and a measured crankcase pressure measured from a pressure sensor configured to measure an internal pressure of the crankcase.

15 Claims, 7 Drawing Sheets

| Small size engine | | | | | | | | |
|---|---|---|---|---|---|---|---|---|
| X | 0 | 50 | 100 | 200 | 300 | 400 | 500 | 600 |
| Z | 0 | 1.71875 | 3.984375 | 11.875 | 24.375 | 41.484375 | 63.203125 | 104.375 |

FIG. 4

FIG. 5

| Large size engine | | | | | | | | | |
|---|---|---|---|---|---|---|---|---|---|
| | X | 0 | 200 | 400 | 600 | 800 | 1000 | 1200 | 1500 |
| | Z | 0 | 5 | 25 | 45 | 70 | 100 | 130 | 200 |

APPARATUS AND METHOD FOR DIAGNOSING BLOW-BY GAS RECIRCULATION SYSTEM

CROSS REFERENCE TO RELATED APPLICATIONS

This application claims priority to and the benefit of Korean Patent Application No. 10-2023-0068594 filed in the Korean Intellectual Property Office on May 26, 2023, the entire contents of which is incorporated herein by reference.

BACKGROUND

(a) Field

The present disclosure relates to an apparatus and method for diagnosing a blow-by gas recirculation system. More particularly, the present disclosure relates to an apparatus and method for diagnosing a blow-by gas recirculation system for diagnosing abnormality of a breather hose connecting connect an intake line and a crankcase.

(b) Description of the Related Art

In general, an internal combustion engine used as a power source in a vehicle or the like includes a cylinder forming a combustion chamber having a predetermined volume, a piston vertically reciprocating within the cylinder, a crank device converting the reciprocal motion of the piston to rotational movement, a head cover (alternatively, rocker cover) mounted above the combustion chamber, and an oil pan mounted below the combustion chamber to accommodate lubrication oil.

The internal combustion engine introduces fuel and air into the combustion chamber, compresses and explodes the mixture of fuel and air, and causes the piston to reciprocate, and the reciprocal motion of the piston is converted to rotational movement by the crank device to form the power required for moving the vehicle.

During operation of the internal combustion engine, some of the non-combusted gas in the compression stroke and some of the combustion gas in the expansion stroke leak toward the head cover, crankcase, or oil pan, and the leaking blow-by gas may deteriorate the lubricating oil stored in the oil pan, or it may corrode the inside of the internal combustion engine.

In this way, when the blow-by gas harmful to the internal combustion engine as well as to human beings is released into the atmosphere from the internal combustion engine, air pollution is caused, and therefore, a blow-by gas recirculation system for recirculating the blow-by gas into the combustion chamber of the internal combustion engine for re-combusting has been applied.

In the conventional blow-by gas recirculation system, a breather hose connected to the head cover through a nipple is installed in the middle of the elbow hose at the downstream (or rear end) of the air-cleaner, and the head-by gas is supplied to the head cover by using a pressure difference to the fresh air introduced from the outside during the operation of the engine.

However, the breather hose mounted through the nipple may be disconnected from the head cover for various reasons while the vehicle is running. In order to detect the disconnection of the breather hose, conventionally, a method of comparing the internal pressure of the crankcase with a reference value for fault diagnosis has been used, but many misdiagnoses have occurred according to the conventional method.

The above information disclosed in this Background section is only for enhancement of understanding of the background of the disclosure, and therefore it may contain information that does not form the prior art that is already known in this country to a person of ordinary skill in the art.

SUMMARY

The present disclosure attempts to provide an apparatus and method for diagnosing a blow-by gas recirculation system capable of accurately determining abnormality of a breather hose in a blow-by gas recirculation system.

An apparatus for diagnosing a blow-by gas recirculation system may include a head portion of an engine configured to form a combustion chamber, a head cover provided on an upper portion of the head portion, a crankcase formed on a lower portion of the combustion chamber, an intake line through which an intake-air flows to the combustion chamber, a breather hose connecting the crankcase and the intake line at an upstream side of a compressor mounted on the intake line, a PCV hose connecting the crankcase and a surge tank, and a controller configured to determine an abnormality of the breather hose based on a modelled crankcase pressure determined from an atmospheric pressure and an intake flow rate introduced through a throttle valve and a measured crankcase pressure measured from a pressure sensor configured to measure an internal pressure of the crankcase, where the controller may be configured to exclude the measured crankcase pressure measured by the pressure sensor while an intake flow rate fluctuation condition in which the intake flow rate abruptly changes in a transient period is satisfied, for determining the abnormality of the breather hose.

The controller may be configured to calculate an accumulated model pressure by accumulating the modelled crankcase pressure a preset number of times for each preset interval, calculate an accumulated measured pressure by accumulating the measured crankcase pressure measured by the pressure sensor, and diagnose the abnormality of the breather hose by calculating a ratio between the accumulated model pressure and the accumulated measured pressure.

The intake flow rate fluctuation condition is satisfied, when a decrease rate of an engine speed is larger than a predetermined speed ratio, or a closing change rate of the throttle valve is larger than a predetermined closing ratio, or an opening of a waste gate valve is larger than a preset amount, or, a decrease rate of the intake flow rate is larger than a predetermined decreasing ratio.

When the intake flow rate fluctuation condition is satisfied, the controller may be configured to calculate the accumulated measured pressure by excluding the measured crankcase pressure measured by the pressure sensor until a predetermined time is lapsed.

The controller may be configured to determine that the abnormality of the breather hose has occurred, when the ratio between the accumulated model pressure and the accumulated measured pressure is smaller than a predetermined pressure ratio.

The controller may be configured to diagnose the abnormality of the breather hose only when a boost pressure by the compressor is greater than a predetermined pressure and an opening of the throttle valve is greater than a preset amount.

The modelled crankcase pressure may be determined based on a difference between the atmospheric pressure and a pressure loss value by an air-cleaner determined from the intake flow rate.

The pressure loss of the air-cleaner according to the intake flow rate may be stored in advance in the controller in the form of map data.

A method for diagnosing a blow-by gas recirculation system may include measuring an atmospheric pressure and an intake flow rate, calculating a modelled crankcase pressure based on the atmospheric pressure and a pressure loss of an air-cleaner according to the intake flow rate, determining whether an intake flow rate fluctuation condition is satisfied in a transient period, and determining an abnormality of the breather hose based on a measured crankcase pressure and the modelled crankcase pressure, where the abnormality of the breather hose is determined by excluding the measured crankcase pressure measured when the intake flow rate fluctuation condition is satisfied.

The modelled crankcase pressure may be determined based on difference between the atmospheric pressure and a pressure loss value by the air-cleaner determined from the intake flow rate.

A pressure loss of the air-cleaner according to the intake flow rate may be stored in advance in a controller in the form of map data.

The determining may include calculating an accumulated model pressure by accumulating the modelled crankcase pressure preset number of times for each preset interval, calculating an accumulated measured pressure by accumulating the measured crankcase pressure preset number of times for each preset interval, calculating the accumulated measured pressure by excluding the measured crankcase pressure measured when the intake flow rate fluctuation condition is satisfied, and diagnosing the abnormality of the breather hose by calculating a ratio between the accumulated model pressure and the accumulated measured pressure.

The intake flow rate fluctuation condition may be satisfied when a decrease rate of an engine speed is larger than a predetermined speed ratio, or a closing change rate of the throttle valve is larger than a predetermined closing ratio, or an opening of a waste gate valve is larger than a preset amount, or a decrease rate of the intake flow rate is larger than a predetermined decreasing ratio.

It may be determined that abnormality of the breather hose has occurred when the ratio between the accumulated model pressure and the accumulated measured pressure is smaller than a predetermined pressure ratio.

The abnormality of the breather hose may be diagnosed only when a pressure of a compressor is greater than a predetermined pressure and an opening of a throttle valve is greater than a preset amount.

According to an apparatus for diagnosing a blow-by gas recirculation system according to an embodiment as described above, a modelled crankcase pressure based on pressure difference with respect to the atmospheric pressure due to the air filter of the air-cleaner is first calculated, and then the abnormality of a breather hose may be accurately determined based on the modelled crankcase pressure and a measured crankcase pressure measured by a crankcase pressure sensor.

In addition, abnormality of a breather hose may be determined more accurately by excluding crankcase internal pressure values in a transient period.

Other effects that may be obtained or are predicted by an embodiment will be explicitly or implicitly described in a detailed description of the present disclosure. That is, various effects that are predicted according to an embodiment will be described in the following detailed description.

BRIEF DESCRIPTION OF THE FIGURES

These drawings are for reference only in describing embodiments of the present disclosure, and therefore the technical idea of the present disclosure should not be limited to the accompanying drawings.

FIG. 4 and FIG. 5 are charts showing a pressure loss by air-cleaner according to an intake flow rate according to an embodiment.

Figure 1:
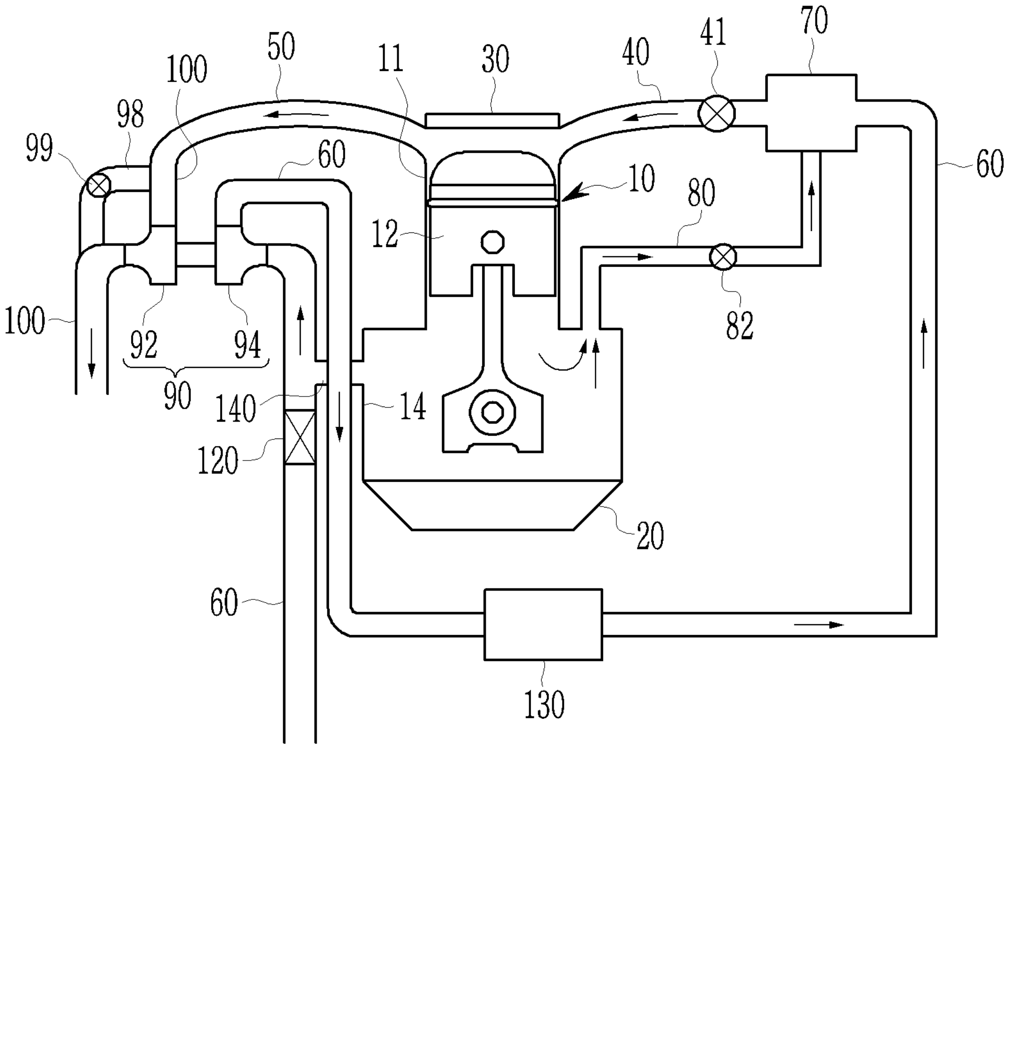
FIG. 1 is a schematic view showing a configuration of a blow-by gas recirculation system according to an embodiment.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

The terminology used herein is for the purpose of describing particular embodiments only and is not intended to be limiting of the present disclosure. As used herein, the singular forms are intended to include the plural forms as well, unless the context clearly indicates otherwise. As used herein, the term “comprises” and/or “comprising” refers to the presence of specified features, integers, steps, acts, elements and/or components, but it should also be understood that it does not exclude a presence or an addition of one or more other features, integers, steps, acts, components, and/or groups thereof. As used herein, the term “and/or” includes any one or all combinations of one or more related items.

Additionally, it is understood that one or more of the below methods, or aspects thereof, may be executed by at least one controller. The term “controller” may refer to a hardware device that includes a memory and a processor. The memory is configured to store program instructions, and the processor is specifically programmed to execute the program instructions to perform one or more processes which are described further below. The controller may control operation of units, modules, parts, devices, or the like, as described herein. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

The drawings and description are to be regarded as illustrative in nature and not restrictive, and like reference numerals designate like elements throughout the specification.

In addition, the size and thickness of each configuration shown in the drawings are arbitrarily shown for understanding and ease of description, but the present disclosure is not limited thereto, and for clearly illustrate several portions and regions, thicknesses thereof are increased.

The terms "module" and "unit" for components used in the following description are used only in order to make the specification easier. Therefore, these terms do not have meanings or roles that distinguish them from each other by themselves.

In describing embodiments of the present specification, when it is determined that a detailed description of the well-known art associated with the present disclosure may obscure the gist of the present disclosure, it will be omitted.

The accompanying drawings are provided only in order to allow embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

The sequence of operations or steps is not limited to the order presented in the claims or figures unless specifically indicated otherwise. The order of operations or steps may be changed, several operations or steps may be merged, a certain operation or step may be divided, and a specific operation or step may not be performed.

Hereinafter, an apparatus for diagnosing a blow-by gas recirculation system according to an embodiment will be described in detail with reference to the accompanying drawings.

FIG. 1 is a schematic view showing a configuration of a blow-by gas recirculation system according to an embodiment. In addition, FIG. 2 is a block diagram showing a configuration of an apparatus for diagnosing a blow-by gas recirculation system according to an embodiment.

Figure 2:
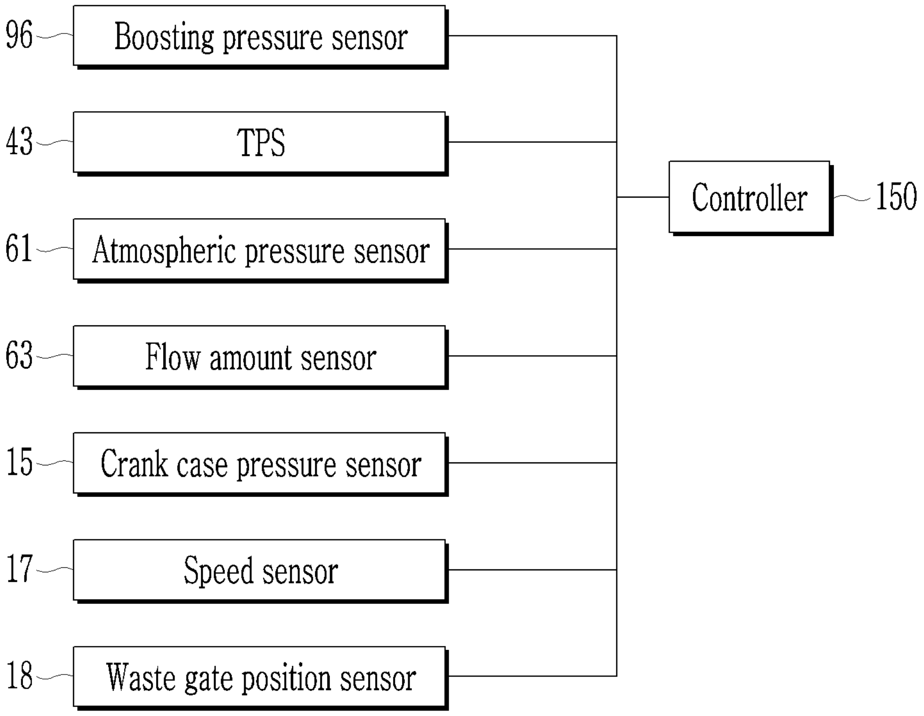
FIG. 2 is a block diagram showing a configuration of an apparatus for diagnosing a blow-by gas recirculation system according to an embodiment.

As shown in FIG. 1 and FIG. 2, an engine to which a blow-by gas recirculation system according to an embodiment is applied includes a head portion 11 forming at least one combustion chamber 10.

A crankcase 14 accommodating a crank device and an oil pan 20 accommodating lubricant are provided are at lower portion of the head portion 11 forming the combustion chamber 10, and a head cover 30 (alternatively, a rocker cover) is mounted on an upper portion of the head portion 11 forming the combustion chamber 10.

An intake manifold 40 configured to supply an ambient air into a plurality of combustion chambers and an exhaust manifold 50 configured to exhaust an exhaust gas generated in the combustion chamber are connected to the combustion chamber 10, respectively.

The intake manifold 40 is connected to an intake line 60 through which intake air introduced from the outside and supplied to the combustion chamber flows, and a surge tank 70 is installed in the intake line 60. An air-cleaner 120 including an air filter for filtering air introduced from the outside is installed in the intake line 60, and a throttle valve 41 for adjusting an intake flow rate supplied to the combustion chamber through the intake line 60 is installed in the intake manifold 40.

An exhaust line 100 for discharging exhaust gas generated in the combustion chamber to the outside are respectively connected to the exhaust manifold 50.

A piston 12 reciprocating up and down is installed inside the combustion chamber 10, and an air/fuel mixture of fuel and air flowing into the combustion chamber 10 is compressed and expanded by the piston 12 to generate power required to drive the vehicle.

An engine to which the blow-by recirculation system according to an embodiment is applied is provided with a turbocharger 90 for compressing intake air introduced from the outside.

The turbocharger 90 may include a turbine 92 installed in the exhaust line 100 and operated by the exhaust gas, and a compressor 94 installed in the intake line 60 and interlocked with the turbine 92 to compress the intake air introduced from the outside.

The turbocharger 90 is provided with a waste gate valve 99 configured to adjust the amount of the exhaust gas exhausted from the combustion chamber and supplied to the turbine 92.

The waste gate valve 99 is provided in an exhaust bypass line 98 branching from an upstream of the turbine 92 and rejoining to a downstream of the turbine 92, in the exhaust line 100, and the amount of exhaust gas supplied to the turbine 92 may be adjusted by adjusting the opening of the waste gate valve 99.

An intercooler 130 configured to cool the intake air at high temperature and high pressure compressed by the compressor 94 is installed on the intake line 60 at a downstream of the compressor 94.

In the present disclosure, the turbocharger 90 including the turbine 92 and the compressor 94 has been described as an example as a means for compressing the intake air, but the scope of the present disclosure is not limited thereto, and an electric supercharger configured to compress the intake air by an electric motor may also be applied.

In order to recirculate blow-by gas leaked from the combustion chamber 10 to the combustion chamber 10, a blow-by recirculation system according to an embodiment may include a breather hose 140, a positive crankcase ventilation (PCV) hose, and a PCV valve 82.

The breather hose 140 connects the intake line 60 and the crankcase 14. At this time, the breather hose 140 is branched from the intake line 60 at an upstream of the compressor 94 to connect the crankcase 14.

The PCV hose 80 connects the crankcase 14 and the surge tank 70, and the PCV valve 82 is mounted on the PCV hose 80. The PCV valve 82 is provided to supply the blow-by gas flowing into the crankcase when the engine is operated to the combustion chamber 10 of the engine, and the operation and configuration of the PCV valve 82 are known in the art.

Meanwhile, an apparatus for diagnosing a blow-by gas recirculation system according to an embodiment may include an atmospheric pressure sensor 61 configured to measure an atmospheric pressure, a flow amount sensor 63 configured to measure the intake flow rate flowing into the combustion chamber according to an opening of the throttle valve 41, a throttle position sensor (TPS) 43 configured to measure the opening of the throttle valve 41, a boost pressure sensor 96 configured to measure an intake pressure boosted by the compressor 94, a crankcase pressure sensor 15 configured to measure an internal pressure of the crankcase 14, a speed sensor 17 configured to measure an engine speed, and a waste gate position sensor 18 configured to measure opening (alternatively, position) of the waste gate valve 99.

The atmospheric pressure measured by the atmospheric pressure sensor 61, the intake flow rate measured by the flow amount sensor 63, and the opening of the throttle valve 41 measured by the throttle position sensor 43, the crankcase pressure measured by the crankcase pressure sensor 15, the engine speed measured by the speed sensor 17, and, the opening of the waste gate valve 99 measured by the waste gate position sensor 18 are transmitted to a controller 150.

The controller 150 is configured to determine an abnormality of the breather hose 140 based on a modelled crankcase pressure determined from the atmospheric pressure and the intake flow rate flowing into the combustion chamber through the throttle valve 41 and a measured crankcase pressure measured by the crankcase pressure sensor 15. At this time, the controller 150 is configured to determine the abnormality of the breather hose 140 by excluding the measured crankcase pressure measured by the crankcase pressure sensor 15 when the intake flow rate fluctuation condition in which the intake flow rate abruptly changes in a transient period is satisfied.

To this end, the controller 150 may be implemented with one or more processors that operate according to a preset program, and program instructions programmed to perform each step of a method according to the present disclosure through the one or more processor are stored in the memory of the controller.

Hereinafter, a method for diagnosing a blow-by gas recirculation system according to an embodiment will be described in detail with reference to the accompanying drawings.

Figure 3A:
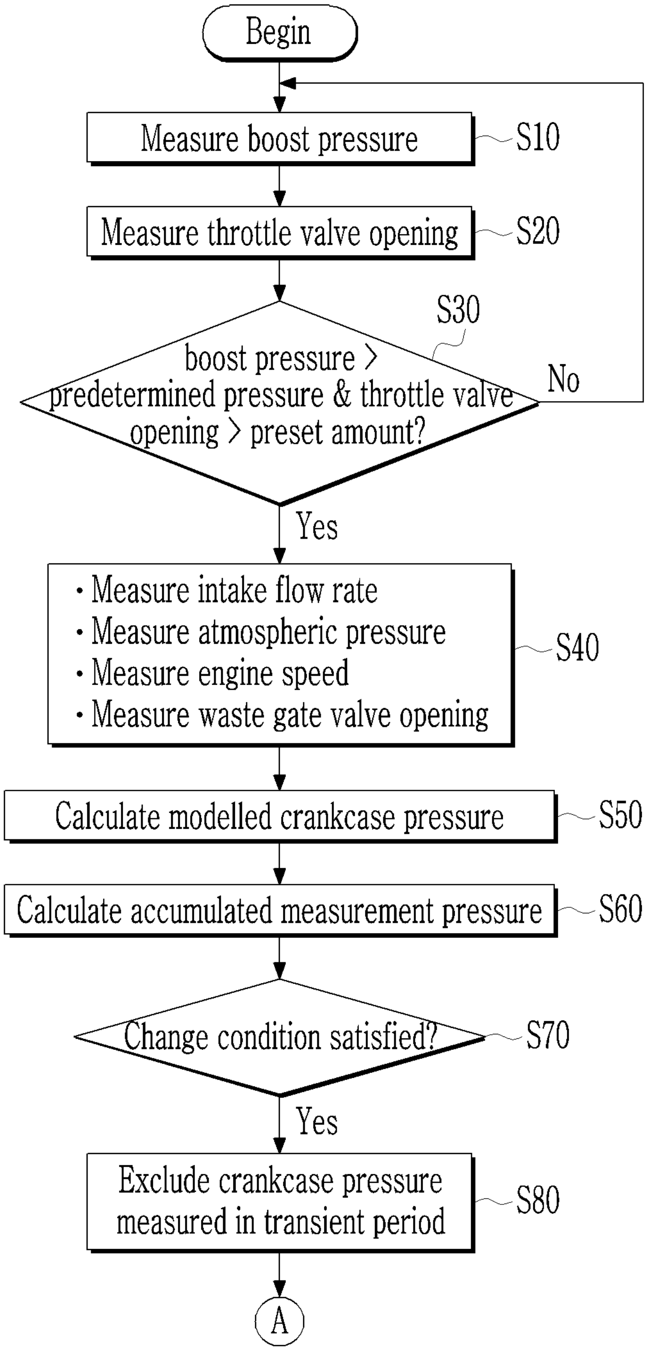
FIG. 3A and FIG. 3B are flowcharts showing a method for diagnosing a blow-by gas recirculation system according to an embodiment.
Figure 3B:
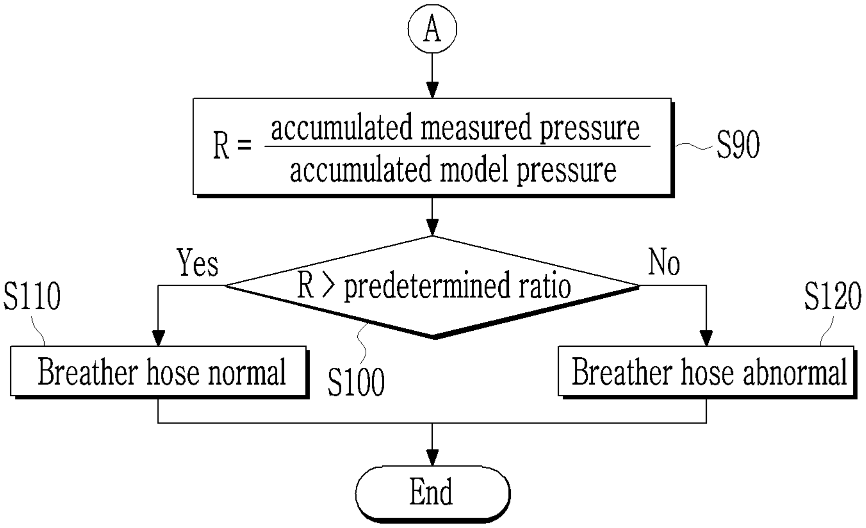

FIG. 3A and FIG. 3B are flowcharts showing a method for diagnosing a blow-by gas recirculation system according to an embodiment.

As shown in FIG. 3A and FIG. 3B, at step S10, while the vehicle is running, the boost pressure sensor 96 measures the boost pressure of the intake air compressed by the compressor 94, and the boost pressure of the intake air measured by the boost pressure sensor 96 is transmitted to the controller 150.

At step S20, the throttle position sensor 43 measures the opening of the throttle valve 41, and the opening of the throttle valve 41 measured by the throttle position sensor 43 is transmitted to the controller 150.

At step S30, the controller 150 determines whether the boost pressure is greater than a predetermined pressure and the opening of the throttle valve 41 is greater than a preset amount.

When the boost pressure is less than the predetermined pressure (for example, 1,100 hPa) and the opening of the throttle valve 41 is less than the preset amount (for example, 15%) at the step S30, the process of diagnosing the abnormality of the breather hose 140 is not performed.

When the boost pressure is less than the predetermined pressure and the opening of the throttle valve 41 is smaller than the preset amount, the flow rate of the blow-by gas moving through the breather hose 140 and the PCV hose 80 is not sufficient, and therefore, it may not be easy to determine the abnormality of the breather hose 140. Therefore, in this case, the abnormality of the breather hose 140 is not determined.

When the boost pressure is greater than the predetermined pressure and the opening of the throttle valve 41 is larger than the preset amount at the step S30. At step S40, the atmospheric pressure sensor 61 measures the atmospheric pressure, and the atmospheric pressure measured by the atmospheric pressure sensor 61 is transmitted to the controller 150. In addition, at the step S40, the flow amount sensor 63 measures the intake flow rate flowing into the intake line 60 according to the opening of the throttle valve 41, and the intake flow rate measured by the flow amount sensor 63 is transmitted to the controller 150. In addition, at the step S40, the speed sensor 17 measures the engine speed, and the engine speed measured by the speed sensor 17 is transmitted to the controller 150. In addition, at the step S40, in addition, the waste gate position sensor 18 measures the opening of the waste gate valve 99, and the opening of the waste gate valve 99 measured by the waste gate position sensor 18 is transmitted to the controller 150.

At step S50, the controller 150 calculates the modelled crankcase pressure based on the atmospheric pressure measured by the atmospheric pressure sensor 61 and the intake flow rate measured by the flow amount sensor 63.

The modelled crankcase pressure is determined based on a difference between the atmospheric pressure and a pressure loss due to the air filter of the air-cleaner 120, and here, the pressure loss due to the air filter is determined by the intake flow rate. The above may be expressed in the equation as follows.

Modelled crankcase pressure=Atmospheric pressure−Pressure loss due to the air filter    Equation 1:

Here, the pressure loss due to the air filter according to the intake flow rate may be stored in advance in the controller 150 in the form of map table.

In the case of a small size engine, the pressure loss due to the air filter according to the intake flow rate may be determined as the table of FIG. 4. In addition, in the case of a large size engine, the pressure loss due to the air filter according to the intake flow rate may be determined as the table of FIG. 5.

For example, for the small size engine, when the atmospheric pressure measured by the atmospheric pressure sensor 61 is 102.3 kPa and the intake flow rate measured by the flow amount sensor 63 is 50 kg/h, the pressure loss due to the air-cleaner 120 is 1.71875 kPa (refer to FIG. 4). Therefore, the modelled crankcase pressure is 100.58125 kPa. In FIG. 4 and FIG. 5, X denotes the intake flow rate, and Z denotes the pressure loss due to the air-cleaner 120.

In addition, the controller 150 calculates the modelled crankcase pressure for each preset interval (for example, 1 second), and calculates an accumulated model pressure by accumulating the modelled crankcase pressure calculated for each preset interval by preset number of times (for example, 1,000 times).

In addition, at step S60, the controller 150 receives the measured crankcase pressure measured by the crankcase pressure sensor 15 for each preset interval (for example, 1 second), and calculate an accumulated measured pressure by accumulating the measured crankcase pressure received at the preset interval by preset number of times (for example, 1,000 times).

At step S70, the controller 150 determine the intake flow rate fluctuation condition in which the intake flow rate abruptly changes in the transient period is satisfied. When the intake flow rate fluctuation condition is satisfied, at step S80, the measured crankcase pressure measured by the crankcase pressure sensor 15 and input to the controller 150 is excluded when calculating the accumulated measured pressure.

The intake flow rate fluctuation condition may be satisfied when a decrease rate of the engine speed is larger than a predetermined speed ratio, or a closing change rate of the throttle valve is larger than a predetermined closing ratio, or the opening of the waste gate valve 99 is larger than the preset amount, or a decrease rate of the intake flow rate is larger than a predetermined decreasing ratio.

In more detail, the controller 150 determines whether the decrease rate of the engine speed measured through the speed sensor 17 is larger than the predetermined ratio. When the decrease rate of the engine speed is greater than a predetermined speed ratio (for example, 1,212 rpm/sec), the controller 150 may exclude the measured crankcase pressure measured by the crankcase pressure sensor 15 in calculating the accumulated measured pressure until a predetermined time (for example, 0.5 second) is lapsed. When the engine speed abruptly decreases due to shifting of the transmission, the measured crankcase pressure measured by the crankcase pressure sensor 15 may abruptly increase. Therefore, by excluding the measured crankcase pressure measured during the transient period, misdiagnosis in determining the abnormality of the breather hose 140 may be prevented.

The controller 150 determines whether the closing change rate of the throttle valve measured through the throttle position sensor is larger than the predetermined closing ratio. When the closing change rate of the throttle valve is greater than the predetermined closing ratio (for example, 110 deg/sec), the controller 150 may exclude the measured crankcase pressure measured by the crankcase pressure sensor 15 in calculating the accumulated measured pressure until the predetermined time (for example, 0.5 second) is lapsed. When the throttle valve is abruptly closed after being opened, the measured crankcase pressure measured by the crankcase pressure sensor 15 may abruptly increase. Therefore, by excluding the measured crankcase pressure measured during the transient period, misdiagnosis in determining the abnormality of the breather hose 140 may be prevented.

The controller 150 determines whether the opening of the waste gate valve 99 measured through the waste gate position sensor 18 is larger than the preset amount. When the opening of the waste gate valve 99 is larger than the preset amount (for example, 90%), the controller 150 may exclude the crank pressure value input to the controller 150 until the predetermined time (for example, 0.1 second) is lapsed. When the opening of the waste gate valve 99 is larger than the preset amount (for example, 90%), the exhaust gas is mostly exhausted to the outside through the exhaust bypass line 98 without passing through the turbine 92 of the turbocharger 90. Therefore, since the supercharging effect of the intake air by the turbocharger 90 hardly occurs, the intake air flow rate supplied to the combustion chamber 10 is substantially reduced, and the measured crankcase pressure measured by the crankcase pressure sensor 15 may abruptly increase. By excluding the measured crankcase pressure measured during the transient period, misdiagnosis in determining the abnormality of the breather hose 140 may be prevented.

Alternatively, the controller 150 determines whether the decrease rate of the intake flow rate measured through the flow amount sensor is larger than the predetermined decreasing ratio. When the decrease rate of the intake flow rate measured through the flow amount sensor is greater than the predetermined decreasing ratio (for example, 0.004 m3/sec)), the controller 150 may exclude the measured crankcase pressure measured by the crankcase pressure sensor 15 in calculating the accumulated measured pressure until the predetermined time (for example, 0.3 second) is lapsed. Due to various reasons, when the decrease rate of the intake flow rate is larger than the predetermined decreasing ratio, the measured crankcase pressure measured by the crankcase pressure sensor 15 may abruptly increase. Therefore, by excluding the measured crankcase pressure measured during the transient period, misdiagnosis in determining the abnormality of the breather hose 140 may be prevented.

At step S90, when the accumulated model pressure is larger than the predetermined value, the controller 150 calculates a ratio R between the accumulated model pressure and the accumulated measured pressure of the crankcase 14.

When a ratio between the accumulated model pressure and the accumulated measured pressure is greater than a predetermined pressure ratio (for example, 0.75) at step S100, the controller 150 may determine, at step S110, that the breather hose is normal.

To the contrary, when the ratio between the accumulated model pressure and the accumulated measured pressure is less than the predetermined pressure ratio (for example, 0.75), the controller 150 may determine, at step S120, that the abnormality of the breather hose 140 (for example, separation of the breather hose 140) has occurred.

As the pressure (the atmospheric pressure) of the intake air introduced from the outside passes through the air filter of the air-cleaner 120, a pressure loss (or pressure drop) occurs. The difference between the atmospheric pressure and the pressure loss due to the air filter is equal to the internal pressure of the crankcase 14, and the difference between the atmospheric pressure and the pressure loss due to the air filter becomes the modelled crankcase pressure.

Therefore, when the breather hose 140 is normal, the modelled crankcase pressure and the measured crankcase pressure measured by the crankcase pressure sensor 15 should be the same or similar. However, when an abnormality has occurred in the breather hose 140, a difference may occur between the measured crankcase pressure and the modelled crankcase pressure. Through this method, it is possible to determine whether the abnormality of the breather hose 140 has occurred.

Figure 6A:
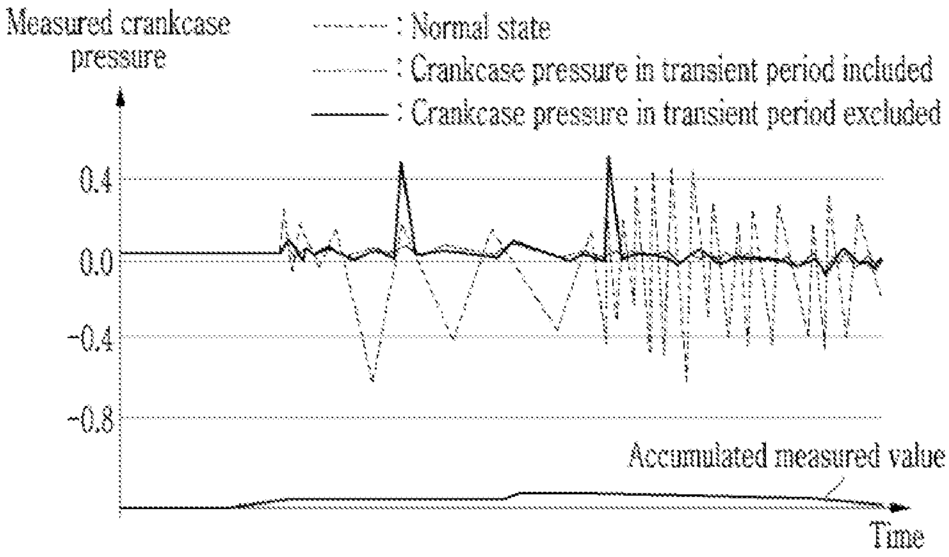
FIGS. 6A and 6B are graphs for showing an effect of a method for diagnosing a blow-by gas recirculation system according to an embodiment.
Figure 6B:
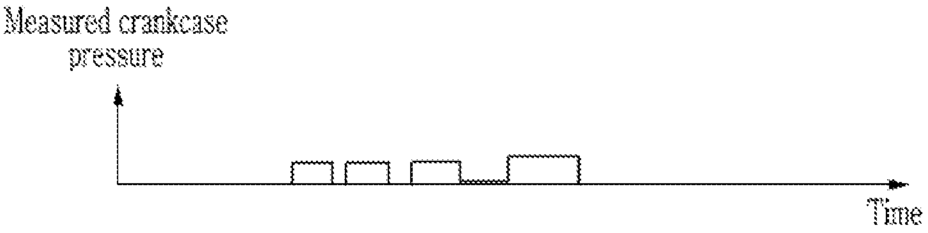

Referring to FIGS. 6A and 6B, when the breather hose 140 is normally fastened, the measured crankcase pressure measured through the crankcase pressure sensor 15 slightly varies (refer to dotted line in FIG. 6A).

As above-described, the diagnosis on the abnormality of the breather hose 140 is performed when the opening of the throttle valve 41 is greater than the preset amount (for example, 15%) and the boost pressure is greater than the predetermined pressure (for example, 1,100 hPa) (refer to FIG. 6B).

When the breather hose 140 is separated, since the measured crankcase pressure change in the transient period is included, an abnormal peak may occur in the measured crankcase pressure (refer to double-dot chain line in FIG. 6A).

However, when the breather hose 140 is separated, by excluding the measured crankcase pressure value in the transient period, the measured crankcase pressure value that is abnormal is excluded (refer to solid line in FIG. 6A). Through this, the accumulated measured pressure obtained by accumulating the measured crankcase pressure may be accurately calculated, and misdiagnosis in determining the abnormality of the breather hose 140 may be minimized.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

The invention claimed is:

1. An apparatus for diagnosing a blow-by gas recirculation system, the apparatus comprising:

a head portion of an engine configured to form a combustion chamber;

a head cover positioned on an upper portion of the head portion;

a crankcase formed on a lower portion of the combustion chamber;

an intake line through which an intake-air flows to the combustion chamber;

a breather hose connecting the crankcase and the intake line at an upstream side of a compressor mounted on the intake line;

a PCV hose connecting the crankcase and a surge tank; and a controller configured to determine an abnormality of the breather hose based on a modelled crankcase pressure determined from an atmospheric pressure and an intake flow rate introduced through a throttle valve, and a measured crankcase pressure measured from a pressure sensor configured to measure an internal pressure of the crankcase;

wherein the controller is further configured to exclude the measured crankcase pressure measured by the pressure sensor while an intake flow rate fluctuation condition in which the intake flow rate abruptly changes in a transient period is satisfied, for determining the abnormality of the breather hose.

2. The apparatus of claim 1, wherein the controller is further configured to:

calculate an accumulated model pressure by accumulating the modelled crankcase pressure a preset number of times for each preset interval;

calculate an accumulated measured pressure by accumulating the measured crankcase pressure measured by the pressure sensor; and diagnose the abnormality of the breather hose by calculating a ratio between the accumulated model pressure and the accumulated measured pressure.

3. The apparatus of claim 2, wherein the intake flow rate fluctuation condition is satisfied, when:

a decrease rate of an engine speed is larger than a predetermined speed ratio; or a closing change rate of the throttle valve is larger than a predetermined closing ratio; or an opening of a waste gate valve is larger than a preset amount; or a decrease rate of the intake flow rate is larger than a predetermined deceasing ratio.

4. The apparatus of claim 3, wherein, when the intake flow rate fluctuation condition is satisfied, the controller is configured to calculate the accumulated measured pressure by excluding the measured crankcase pressure measured by the pressure sensor until a predetermined time is lapsed.

5. The apparatus of claim 2, wherein the controller is configured to determine that the abnormality of the breather hose has occurred, when the ratio between the accumulated model pressure and the accumulated measured pressure is smaller than a predetermined pressure ratio.

6. The apparatus of claim 1, wherein the controller is configured to diagnose the abnormality of the breather hose only when a boost pressure by the compressor is greater than a predetermined pressure and an opening of the throttle valve is greater than a preset amount.

7. The apparatus of claim 1, wherein the modelled crankcase pressure is determined based on a difference between the atmospheric pressure and a pressure loss value by an air-cleaner determined from the intake flow rate.

8. The apparatus of claim 7, wherein the pressure loss of the air-cleaner according to the intake flow rate is stored in advance in the controller in the form of map data.

9. A method for diagnosing a blow-by gas recirculation system, the method comprising:

measuring, by a sensor, an atmospheric pressure and an intake flow rate;

calculating, by a controller, a modelled crankcase pressure based on the atmospheric pressure and a pressure loss of an air-cleaner according to the intake flow rate;

determining, by the controller, whether an intake flow rate fluctuation condition is satisfied in a transient period; and determining, by the controller, an abnormality of the breather hose based on a measured crankcase pressure and the modelled crankcase pressure;

wherein the abnormality of the breather hose is determined by excluding the measured crankcase pressure measured when the intake flow rate fluctuation condition is satisfied.

10. The method of claim 9, wherein the modelled crankcase pressure is determined based on difference between the atmospheric pressure and a pressure loss value by the air-cleaner determined from the intake flow rate.

11. The method of claim 10, wherein a pressure loss of the air-cleaner according to the intake flow rate is stored in advance in a controller in the form of map data.

12. The method of claim 9, wherein determining an abnormality of the breather hose comprises:

calculating an accumulated model pressure by accumulating the modelled crankcase pressure preset number of times for each preset interval;

calculating an accumulated measured pressure by accumulating the measured crankcase pressure preset number of times for each preset interval;

calculating the accumulated measured pressure by excluding the measured crankcase pressure measured when the intake flow rate fluctuation condition is satisfied; and diagnosing the abnormality of the breather hose by calculating a ratio between the accumulated model pressure and the accumulated measured pressure.

13. The method of claim 12, wherein the intake flow rate fluctuation condition is satisfied when:

a decrease rate of an engine speed is larger than a predetermined speed ratio; or a closing change rate of the throttle valve is larger than a predetermined closing ratio; or an opening of a waste gate valve is larger than a preset amount; or a decrease rate of the intake flow rate is larger than a predetermined decreasing ratio.

14. The method of claim 12, wherein it is determined that abnormality of the breather hose has occurred when the ratio between the accumulated model pressure and the accumulated measured pressure is smaller than a predetermined pressure ratio.

15. The method of claim 9, wherein the abnormality of the breather hose is diagnosed only when a pressure of a compressor is greater than a predetermined pressure and an opening of a throttle valve is greater than a preset amount.

* * * * *